United States Patent
Shiau et al.

(10) Patent No.: US 12,223,373 B2
(45) Date of Patent: Feb. 11, 2025

(54) ELECTRONIC DEVICE CAPABLE OF ACCESSING MEMORY CARD

(71) Applicant: REALTEK SEMICONDUCTOR CORPORATION, Hsinchu (TW)

(72) Inventors: Jiunn-Hung Shiau, Hsinchu (TW); Neng-Hsien Lin, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 368 days.

(21) Appl. No.: 17/721,609

(22) Filed: Apr. 15, 2022

(65) Prior Publication Data

US 2023/0004765 A1    Jan. 5, 2023

(30) Foreign Application Priority Data

Jul. 2, 2021    (TW) .................................. 110124348

(51) Int. Cl.
     *H01R 4/24*      (2018.01)
     *G06F 13/38*      (2006.01)
     (Continued)

(52) U.S. Cl.
     CPC ........... *G06K 13/08* (2013.01); *G06F 13/385* (2013.01); *G06K 7/0021* (2013.01); *G06F 2213/0026* (2013.01)

(58) Field of Classification Search
     CPC .... G06K 13/08; G06K 7/0021; G06F 13/385; G06F 2213/0026
     (Continued)

(56) References Cited

U.S. PATENT DOCUMENTS

| | | | | |
|---|---|---|---|---|
| 5,301,240 A | * | 4/1994 | Stockum | H04N 5/76 382/236 |
| 7,222,212 B2 | * | 5/2007 | Lee | G06F 13/385 711/115 |
| 7,660,938 B1 | * | 2/2010 | Chow | G06F 13/4045 711/115 |

(Continued)

FOREIGN PATENT DOCUMENTS

| | | |
|---|---|---|
| TW | I638266 B | 10/2018 |
| TW | 202046122 A | 12/2020 |

OTHER PUBLICATIONS

OA letter of a counterpart TW application (appl. No. 110124348) mailed on Sep. 30, 2021. Summary of the OA letter: Claims 1-4 and 9-10 are rejected under Patent Law Article 22(2) as being unpatentable over reference 1 (TW 638266B) and reference 2 (TW 202046122A). Claim correspondence between the TW counterpart application and the instant US application: Claims 1-10 in the TW counterpart application correspond to claims 1-10 in the instant US application, respectively.

*Primary Examiner* — Abdullah A Riyami
*Assistant Examiner* — Vladimir Imas
(74) *Attorney, Agent, or Firm* — WPAT, PC

(57) ABSTRACT

An electronic device capable of accessing a memory card is provided. The electronic device includes a circuit board, a processing unit, a memory card slot, and a memory card access module. The processing unit is disposed on the circuit board. The memory card slot is disposed on the circuit board, allows the insertion of the memory card, and is coupled to the processing unit through a first signal line. The memory card access module is disposed on the circuit board for accessing the memory card. The memory card access module is coupled to the processing unit through a second signal line and coupled to the memory card slot through a third signal line and a fourth signal line. The first signal line, (Continued)

the second signal line, and the third signal line conform to the standard of a signal transmission interface.

10 Claims, 5 Drawing Sheets

(51) Int. Cl.
*G06K 7/00* (2006.01)
*G06K 13/08* (2006.01)

(58) Field of Classification Search
USPC .......................................................... 439/441
See application file for complete search history.

(56) References Cited

U.S. PATENT DOCUMENTS

| | | | |
|---|---|---|---|
| 8,291,165 B2* | 10/2012 | Tom | G06F 13/385 703/23 |
| 10,403,376 B2* | 9/2019 | Hong | G11C 16/3404 |
| 10,706,000 B2* | 7/2020 | Shiau | G06F 13/385 |
| 11,151,065 B2* | 10/2021 | Lin | G06F 13/4282 |
| 11,379,396 B2* | 7/2022 | Shiau | G06K 19/07741 |
| 11,971,838 B2* | 4/2024 | Huang | G06F 13/4221 |
| 2006/0212640 A1* | 9/2006 | Lee | G06F 13/385 710/315 |
| 2009/0279889 A1* | 11/2009 | Kirkpatrick | H04B 10/25752 398/41 |
| 2011/0072185 A1* | 3/2011 | Pinto | G06F 13/387 710/316 |
| 2013/0271905 A1* | 10/2013 | Sullivan | G06F 1/1607 361/679.02 |
| 2016/0306724 A1* | 10/2016 | Fluet | G06F 11/221 |
| 2020/0387460 A1* | 12/2020 | Lin | G06F 13/4282 |
| 2021/0064551 A1* | 3/2021 | Shiau | G06F 13/4221 |
| 2021/0138732 A1* | 5/2021 | Swier | B33Y 30/00 |
| 2021/0232188 A1* | 7/2021 | Chang | G06F 1/185 |
| 2024/0070429 A1* | 2/2024 | Smith | G06K 19/07739 |

* cited by examiner

ELECTRONIC DEVICE CAPABLE OF ACCESSING MEMORY CARD

BACKGROUND OF THE INVENTION

1. Field of the Invention

The present invention generally relates to memory cards, and, more particularly, to electronic devices that can access memory cards of different generations.

2. Description of Related Art

As the data transmission interfaces advance, memory cards have begun to transmit and receive data through higher-speed transmission interfaces. For example, the original Secure Digital (SD) memory cards support the SD parallel interface (hereinafter referred to as the SD interface), while the new SD memory cards (i.e., SD Express cards) support not only the SD interface but also the Peripheral Component Interconnect Express (PCIe) interface. Therefore, it has become an important issue in this technical field to design an electronic device (e.g., a desktop computer, a notebook computer, a tablet, a handheld device, etc.) that can access memory cards of different generations.

SUMMARY OF THE INVENTION

In view of the issues of the prior art, an object of the present invention is to provide an electronic device, so as to make an improvement to the prior art.

According to one aspect of the present invention, an electronic device capable of accessing memory cards is provided. The electronic device includes a circuit board, a processing unit disposed on the circuit board, a memory card slot, and a memory card access module. The memory card slot is disposed on the circuit board, allows insertion of the memory card, and is coupled to the processing unit through a first signal line. The memory card access module is disposed on the circuit board, coupled to the processing unit through a second signal line, coupled to the memory card slot through a third signal line and a fourth signal line, and used for accessing the memory card. The first signal line, the second signal line, and the third signal line conform to a standard of a signal transmission interface.

The electronic device of the present invention can access memory cards that support a single interface or multiple interfaces. In comparison with the conventional technology, the electronic device of the present invention is more convenient to use when reading the memory cards.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be interpreted accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes an electronic device capable of accessing memory cards. On account of that some or all elements of the electronic device could be known, the detail of such elements is omitted provided that such detail has little to do with the features of this disclosure, and that this omission nowhere dissatisfies the specification and enablement requirements. A person having ordinary skill in the art can choose components equivalent to those described in this specification to carry out the present invention, which means that the scope of this invention is not limited to the embodiments in the specification.

Figure 1:
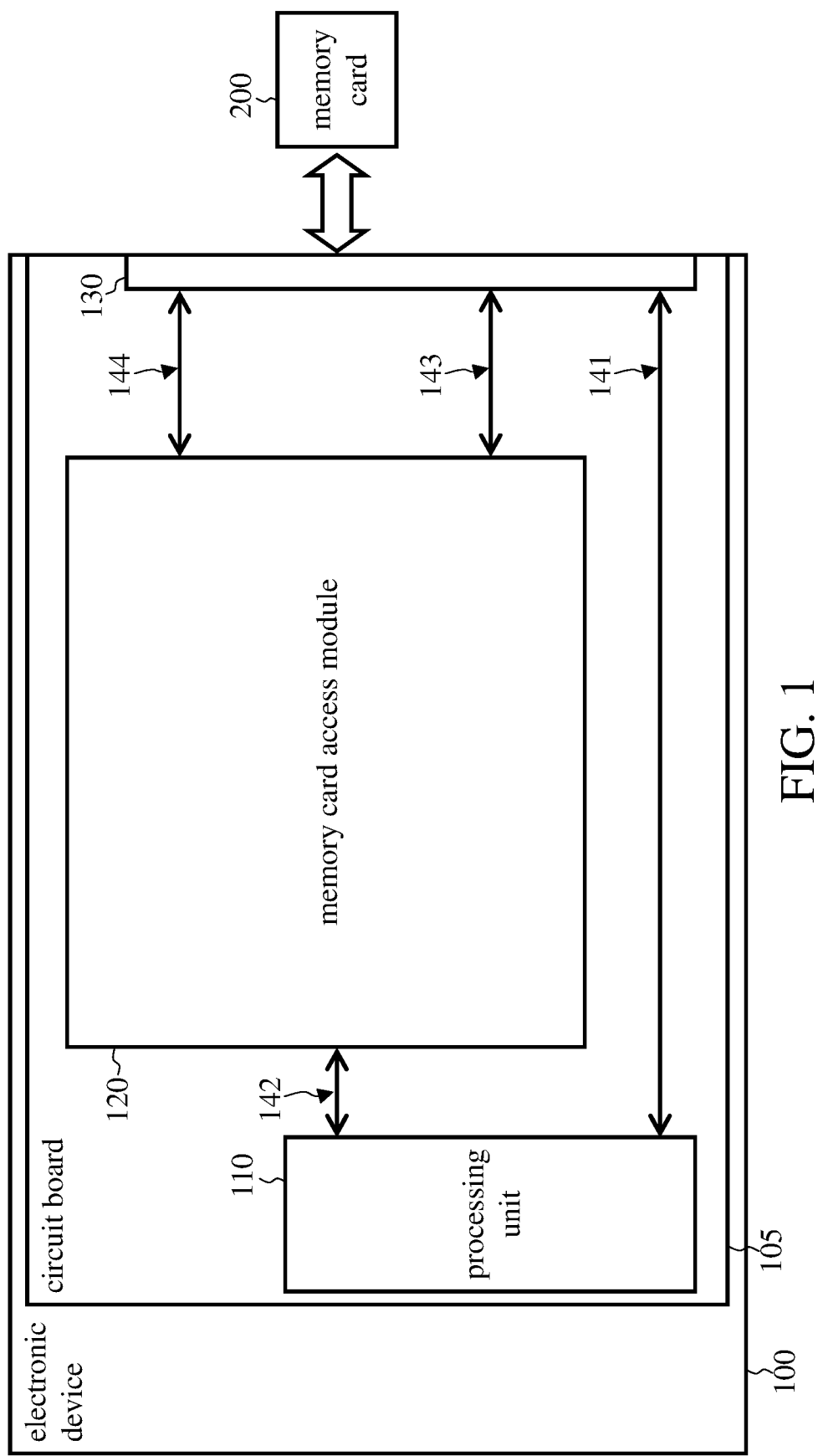
FIG. 1 illustrates a functional block diagram of an electronic device according to an embodiment of the present invention.

FIG. 1 is a functional block diagram of an electronic device according to an embodiment of the present invention. The electronic device 100 can access the memory card 200. The electronic device 100 includes a circuit board 105, as well as a processing unit 110, a memory card access module 120, and a memory card slot 130 that are disposed on the circuit board 105. In some embodiments, the circuit board 105 is a printed circuit board (PCB) and includes a plurality of signal lines (i.e., printed lines or wires): a signal line 141, signal line 142, signal line 143, and signal line 144, which are, for example, arranged on the surface or inside of the PCB. The connection between the processing unit 110 and the memory card slot 130 includes the signal line 141. The connection between the processing unit 110 and the memory card access module 120 includes the signal line 142. The connection between the memory card access module 120 and the memory card slot 130 includes the signal line 143 and the signal line 144. The memory card slot 130 allows the insertion of the memory card 200. The memory card access module 120 is coupled between the processing unit 110 and the memory card slot 130. The functions of the memory card access module 120 include: (1) directly transmitting the control signals (which include but are not limited to read signals, write signals, read addresses, or write addresses) generated by the processing unit 110 to the memory card 200; (2) directly transmitting the data of the memory card 200 to the processing unit 110; and/or (3) converting the formats of the control signals or data prior to transmission. More specifically, the signal line 141, the signal line 142, and the signal line 143 conform to the standard of a first signal transmission interface, the signal line 144 conforms to the standard of a second signal transmission interface, and the standard of the first signal transmission interface is different from the standard of the second signal transmission interface. One of the functions of the memory card access module 120 is to convert the signals or data from the standard of the first signal transmission interface to the standard of the second signal transmission interface or the other way around. The aforementioned term "directly transmitting" means that the signals or data are not converted, that is, the signals or data of the first signal transmission interface are still the signals or data of the first signal transmission interface after passing through the memory card access module 120.

A signal line conforming to the standard of a signal transmission interface means that the signal line has a specific number of pins, and the signal line must be connected or loaded with capacitors and/or terminal resistors of specific value(s) on the circuit board 105. For example, please refer to FIG. 2, which is a schematic diagram of a circuit board of an electronic device according to an embodiment of the present invention. This embodiment shows that the signal line 141, the signal line 142, and the signal line 143 conform to the PCIe standard. The signal line 141, the signal line 142, and the signal line 143 each include four transmission lines, two of which are the receiver differential pair, while the other two of which are the transmitter differential pair. For example, the signal line 141 includes a receiver differential pair 141_r and a transmitter differential pair 141_t. Similar comments can be made about the signal line 142 and the signal line 143. The processing unit 110, the memory card access module 120, and the memory card slot 130 each include eight pins. The four pins (111_1, 111_2, 111_3, and 111_4) of the processing unit 110 are respectively connected to the four pins (121_1, 121_2, 121_3, and 121_4) of the memory card access module 120 through the signal line 142; the four pins (111_5, 111_6, 111_7, and 111_8) of the processing unit 110 are respectively connected to the four pins (131_5, 131_6, 131_7, and 131_8) of the memory card slot 130 through the signal line 141. The four pins (121_5, 121_6, 121_7, and 121_8) of the memory card access module 120 are respectively connected to the four pins (131_1, 131_2, 131_3, and 131_4) of the memory card slot 130 through the signal line 143.

Figure 3:
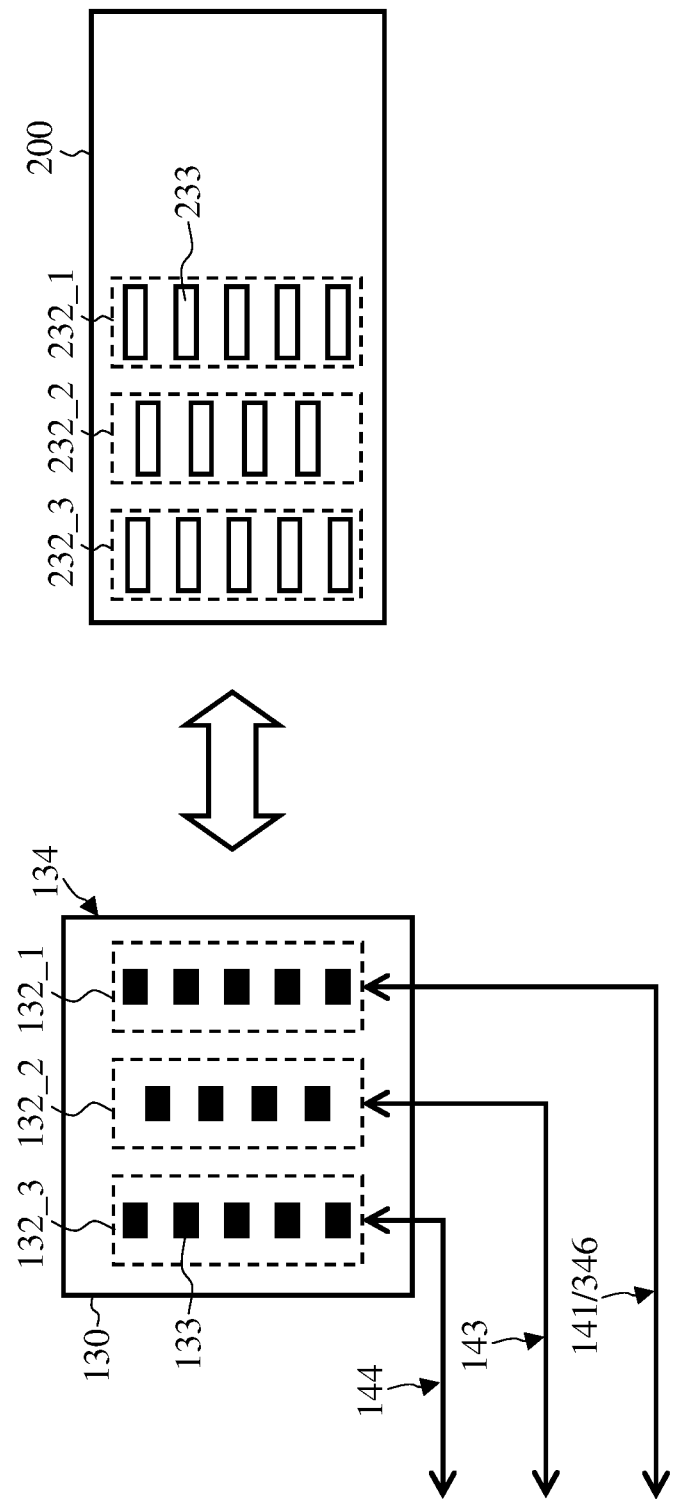
FIG. 3 illustrates a schematic diagram showing the contacts of the memory card slot and the pins of the memory card.

Reference is made to FIG. 3. FIG. 3 is a schematic diagram showing the contacts of the memory card slot 130 and the pins of the memory card 200. The memory card slot 130 includes a first row of contacts 132_1, a second row of contacts 132_2, and a third row of contacts 132_3. Each row of contacts includes a plurality of contacts 133. The memory card 200 includes a first row of pins 232_1, a second row of pins 232_2, and a third row of pins 232_3. Each row of pins includes a plurality of pins 233.

The first row of contacts 132_1, the second row of contacts 132_2, and third row of contacts 132_3 are arranged in order from the opening 134 of the memory card slot 130 to the inner part of the memory card slot 130. The first row of pins 232_1 corresponds to the first row of contacts 132_1; the second row of pins 232_2 corresponds to the second row of contacts 132_2; and the third row of pins 232_3 corresponds to the third row of contacts 132_3. More specifically, when the memory card 200 is inserted into the memory card slot 130, the first row of contacts 132_1 is electrically connected to the first row of pins 232_1, the second row of contacts 132_2 is electrically connected to the second row of pins 232_2, and the third row of contacts 132_3 is electrically connected to the third row of pins 232_3.

The first row of contacts 132_1 is coupled to the processing unit 110 through the signal line 141. The second row of contacts 132_2 is coupled to the memory card access module 120 through the signal line 143. The third row of contacts 132_3 is coupled to the memory card access module 120 through the signal line 144.

Details of the operations of the electronic device 100 are discussed below in connection with FIGS. 1-3 with respect to the scenarios where SD cards of three different standards (e.g., of different generations or supporting different interfaces) are inserted into the memory card slot 130.

When the memory card 200 is an SD card supporting two PCIe lanes (e.g., a memory card of the SD8.0 standard), the memory card 200 includes the first row of pins 232_1, the second row of pins 232_2, and the third row of pins 232_3. After the memory card 200 is inserted into the memory card slot 130, the memory card access module 120 first confirms, through the signal line 144, that the memory card 200 is an SD card supporting the PCIe interface, then the memory card access module 120 provides the clock and power that the memory card 200 requires, and the memory card access module 120 controls its internal circuit (e.g., via a multiplexer) so that the signal line 142 is coupled to or in signal communication with the signal line 143. Next, because the signal line 141 and the signal line 143 are both connected to the pins of the memory card 200, and the signal line 142 is coupled to or in signal communication with the signal line 143, the processing unit 110 will find via receiver detection that the signal line 141 and the signal line 142 are connected to the device (i.e., the memory card 200) and start initialization accordingly. After initialization, the processing unit 110 can accesses the memory card 200 through the zeroth lane of the PCIe interface (Lane 0, namely, the combination of the signal line 142, the memory card access module 120, and the signal line 143) and the first lane of the PCIe interface (Lane 1, namely, the signal line 141).

When the memory card 200 is an SD card supporting one PCIe lane (e.g., the memory card of the SD7.0 standard), the memory card 200 includes the second row of pins 232_2 and the third row of pins 232_3 but does not include the first row of pins 232_1. After the memory card 200 is inserted into the memory card slot 130, the memory card access module 120 first confirms, through the signal line 144, that the memory card 200 is an SD card supporting the PCIe interface, then the memory card access module 120 provides the clock and power that the memory card 200 requires, and the memory card access module 120 controls its internal circuit (e.g., via a multiplexer) so that the signal line 142 is coupled to or in signal communication with the signal line 143. Next, because the signal line 143 is connected to the pins of the memory card 200, and the signal line 142 is coupled to or in signal communication with the signal line 143, the processing unit 110 will find via receiver detection that the signal line 142 is connected to the device (i.e., the memory card 200) and start initialization accordingly. After initialization, the processing unit 110 can access the memory card 200 through the zeroth lane of the PCIe interface (i.e., the combination of the signal line 142, the memory card access module 120, and the signal line 143). In other words, when the memory card 200 is an SD card supporting one PCIe lane, there is no signal on the PCIe lane corresponding to the signal line 141 (i.e., no signal is transmitted through the signal line 141).

When the memory card 200 is an SD card that does not support the PCIe lane (e.g., the SD card of the SD6.0 or older standards), the memory card 200 usually includes the third row of pins 232_3 but might not include the first row of pins 232_1 and the second row of pins 232_2. After the memory card 200 is inserted into the memory card slot 130, the memory card access module 120 first confirms, through the signal line 144, that the memory card 200 is an SD card that does not support the PCIe lane, then the memory card access module 120 converts the data of the memory card 200 into the format of the PCIe interface which is then transmitted to the processing unit 110 through the signal line 142. Through the conversion of the memory card access module 120, the processing unit 110 can access the memory card 200 via the signal line 142, the memory card access module 120, and the signal line 144. In other words, when the memory card 200 is an SD card that does not support the PCIe lane, there is no signal on the signal line 141 and the signal line 143 (i.e., no signal is transmitted through the signal line 141 and the signal line 143).

Reference is made to FIG. 1. Although the zeroth lane (i.e., the combination of the signal line 142, the memory card access module 120, and the signal line 143) does not match the first lane (i.e., the signal line 141) due to the presence of the memory card access module 120 on the zeroth lane, the equalization (EQ) mechanism of the PCIe protocol (which has been introduced since the third generation) can apply different gains to the signals on the two lanes according to the lane conditions to compensate for the signal attenuation caused by the unmatched components on the lanes. Thus, the SD card supporting two PCIe lanes can be accessed correctly. Furthermore, the de-skew mechanism of the PCIe protocol can compensate for the skew between the two lanes, ensuring the alignment of the data on the two lanes.

Figure 2:
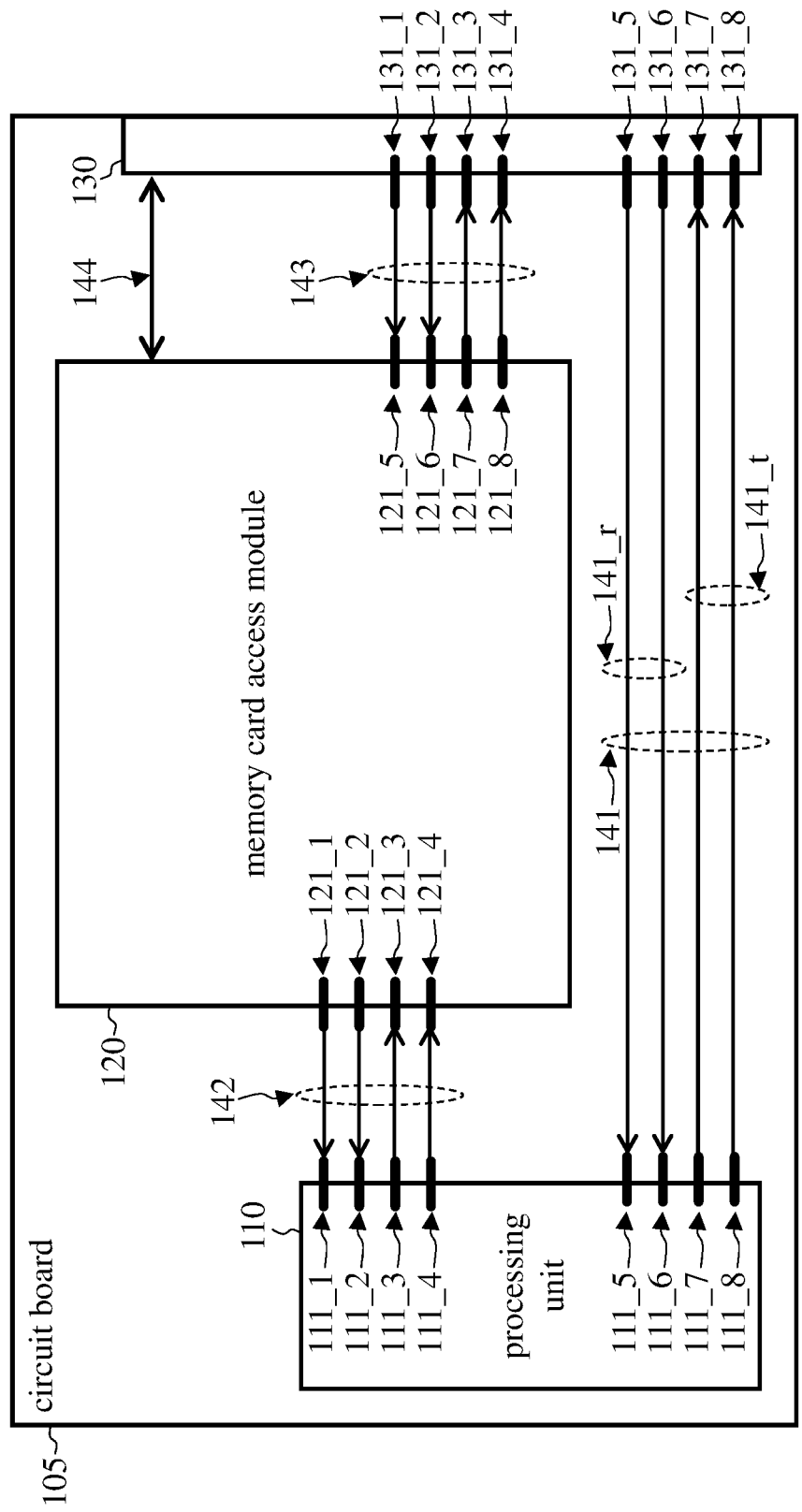
FIG. 2 illustrates a schematic diagram of a circuit board of an electronic device according to an embodiment of the present invention.

In some embodiments, the memory card access module 120 can be embodied by the memory card access module (230) disclosed in FIG. 2 of the U.S. Pat. No. 10,706,000, in which case the signal line 142 is connected to the selection unit (231) of FIG. 2 of that patent application, the signal line 144 is connected to the memory card access unit (233) of FIG. 2 of that patent application, and the signal line 143 is connected to the selection unit (231) through the transmission interface (236) inside the memory card access module (230). Alternatively, the functions of the detection unit (237) can be integrated into the control unit (235), and the control unit (235) detects the memory card through the memory card access unit (233) and the transmission interface (234).

Figure 4:
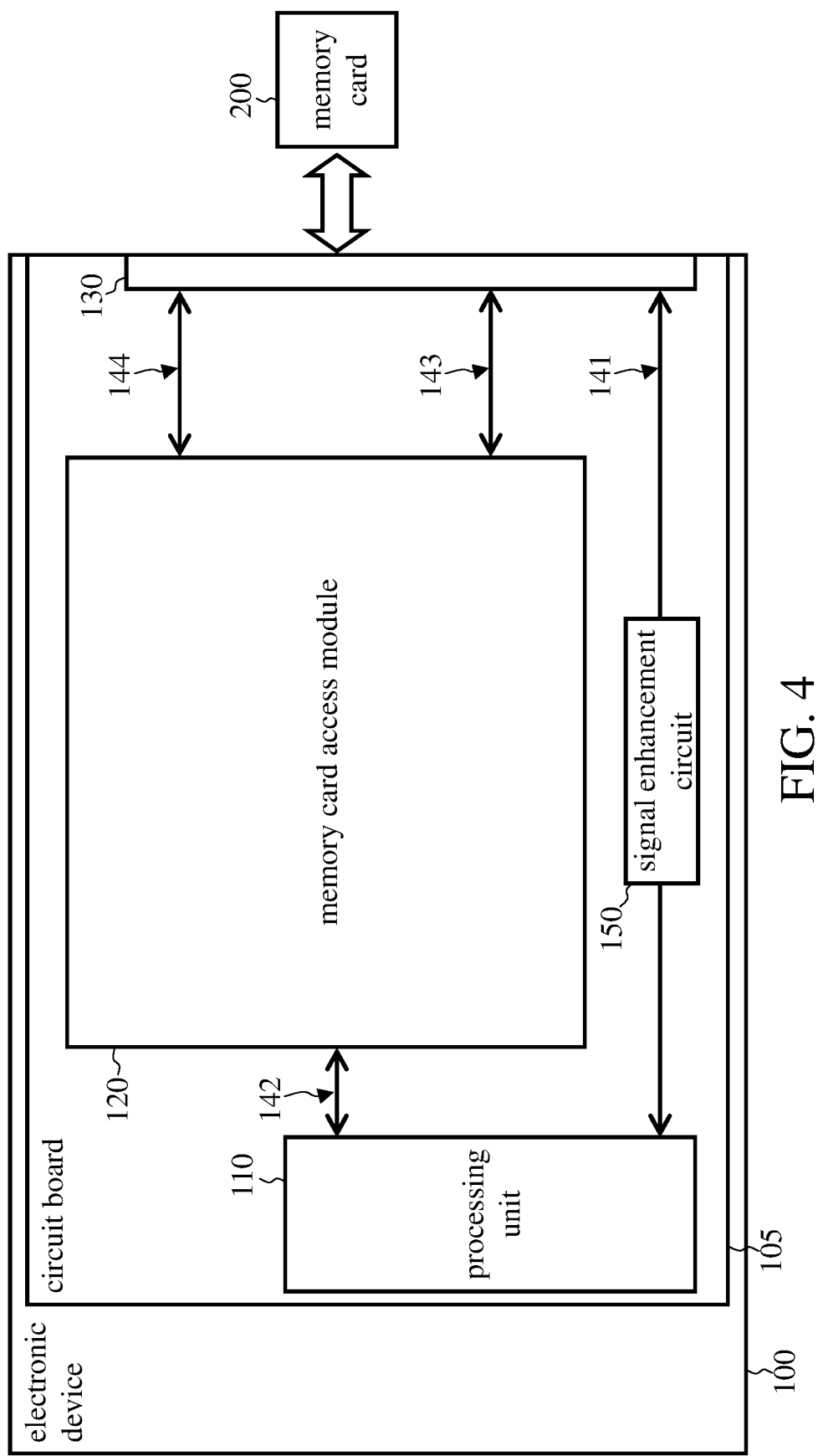
FIG. 4 illustrates a functional block diagram of an electronic device according to another embodiment of the present invention.

In some embodiments, as shown in FIG. 4, a signal enhancement circuit 150 may be installed on the signal line 141. The signal enhancement circuit 150 includes, but is not limited to, a redriver circuit and/or a retimer circuit. Because the redriver circuit and the retimer circuit do not change the data content of the PCIe protocol, in the embodiment of FIG. 4, the processing unit 110 can still be deemed to be coupled to or in signal communication with the memory card slot 130 through the signal line 141.

Figure 5:
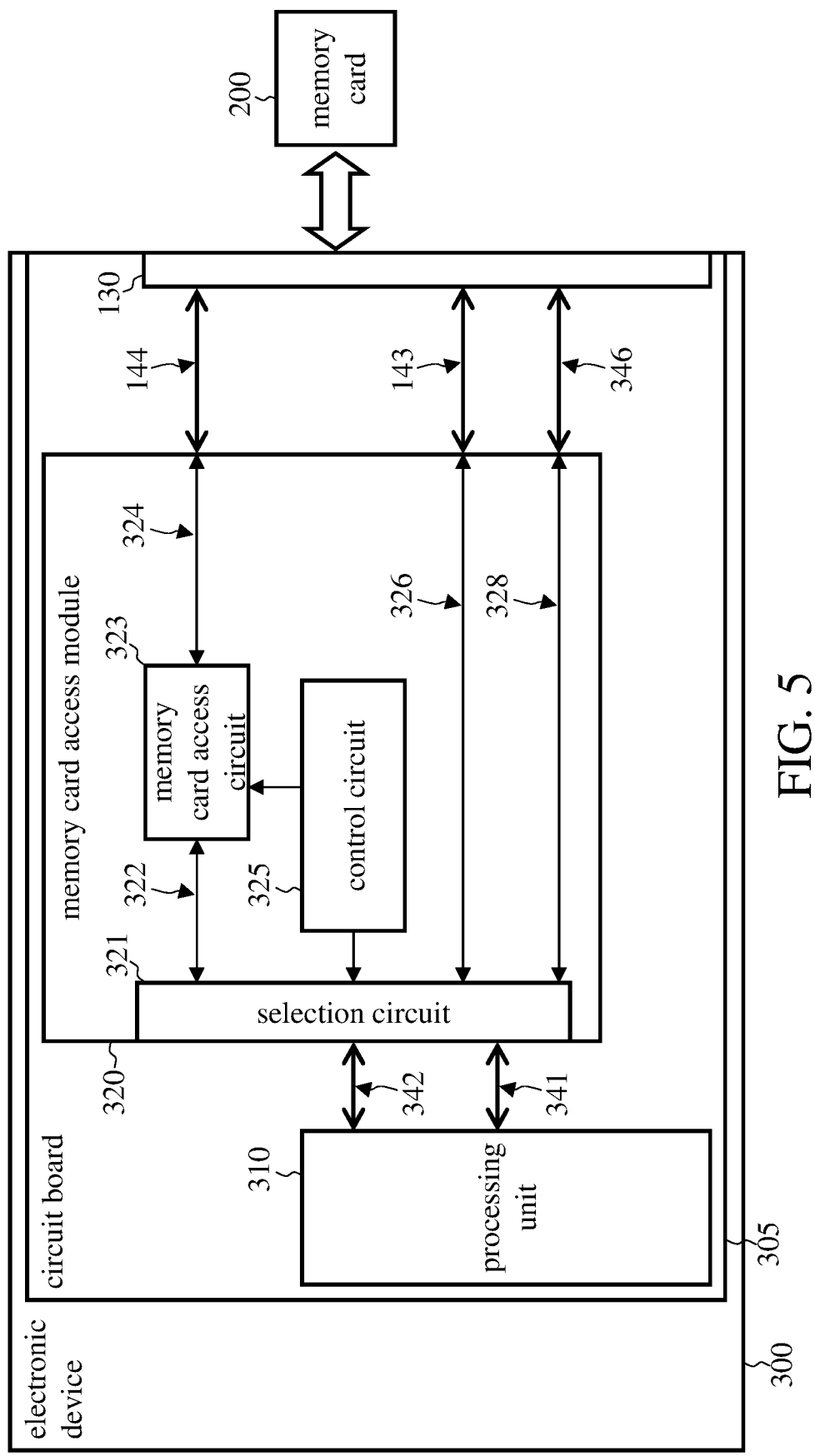
FIG. 5 illustrates a functional block diagram of an electronic device according to another embodiment of the present invention.

FIG. 5 is a functional block diagram of the electronic device according to another embodiment of the present invention. The electronic device 300 can access the memory card 200 and includes a circuit board 305 as well as a processing unit 310, a memory card access module 320, and the memory card slot 130 disposed on the circuit board 305. In some embodiments, the circuit board 305 is a PCB and includes a plurality of signal lines: a signal line 341, a signal line 342, the signal line 143, the signal line 144, and a signal line 346. The connection between the processing unit 310 and the memory card access module 320 includes the signal line 341 and signal line 342. The connection between the memory card access module 320 and the memory card slot 130 includes the signal line 143, signal line 144, and signal line 346. The memory card slot 130 allows the insertion of the memory card 200. The memory card access module 320 is coupled between the processing unit 310 and the memory card slot 130 and has a similar function to the memory card access module 120. The signal line 341, signal line 342, signal line 143, and signal line 346 conform to the standard of the first signal transmission interface, and the signal line 144 conforms to the standard of the second signal transmission interface. Reference is made to FIG. 3. In the embodiment of FIG. 5, the first row of contacts 132_1 of the memory card slot 130 is coupled to the memory card access module 320 through the signal line 346.

The memory card access module 320 includes a selection circuit 321, a transmission interface 322, a memory card access circuit 323, a transmission interface 324, a control circuit 325, a transmission interface 326, and a transmission interface 328. Reference is made to the U.S. Pat. No. 10,706,000. The memory card access circuit 323 of this disclosure is identical or similar to the memory card access unit of that patent application. The functions of the control circuit 325 of this disclosure include the functions of the control unit and the functions of the detection unit of that patent application. When the control circuit 325 has detected that the memory card 200 is an SD card supporting the PCIe interface, the control circuit 325 controls the selection circuit 321 to select the transmission interface 326 and the transmission interface 328, so that the signal line 143 and the signal line 346 are coupled to or in signal communication with the signal line 342 and the signal line 341 through the transmission interface 326 and the transmission interface 328, respectively. The SD memory card may have several PCIe lanes. If there are two PCIe lanes, the processing unit 310 will detect, via receiver detection, that the signal lines 143 and 346 of the memory card 200 are connected to the processing unit, and then the processing unit will start to initialize the two PCIe lanes; if there is only one PCIe lane, the processing unit 310 will find, via receiver detection, that only the signal line 143 of the memory card 200 is connected to the processing unit, and then the processing unit will start to initialize this PCIe lane.

In comparison with the memory card access module 320, the memory card access module 120 has fewer pins (there are no pins coupled to the signal line 341 and the signal line 346); therefore, the memory card access module 120 is smaller and thus more competitive.

The above-mentioned PCIe interface and SD interface are intended to illustrate the invention by way of examples, rather than to limit the scope of the claimed invention. People having ordinary skill in the art can apply the above-mentioned embodiments to other interfaces, such as the CompactFlash Express (CF Express) interface and the Universal Flash Storage (UFS) interface.

Please note that the shape, size, and ratio of any element in the disclosed figures are exemplary for understanding, not for limiting the scope of this invention.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. An electronic device capable of accessing a memory card, comprising:
a circuit board;
a processing unit disposed on the circuit board;
a memory card slot which is disposed on the circuit board, allows insertion of the memory card, and is coupled to the processing unit through a first signal line; and
a memory card access module which is disposed on the circuit board, coupled to the processing unit through a second signal line, coupled to the memory card slot through a third signal line and a fourth signal line, and used for accessing the memory card;

wherein the first signal line, the second signal line, and the third signal line conform to a standard of a signal transmission interface.

2. The electronic device of claim 1, wherein the signal transmission interface is a Peripheral Component Interconnect Express (PCIe) interface.

3. The electronic device of claim 2, wherein the fourth signal line does not support the signal transmission interface.

4. The electronic device of claim 2, wherein the fourth signal line supports a secure digital interface.

5. The electronic device of claim 2, wherein the second signal line and the third signal line correspond to a zeroth lane of the PCIe interface, and the first signal line corresponds to a first lane of the PCIe interface.

6. The electronic device of claim 2, wherein the memory card slot is provided with a first row of contacts, a second row of contacts, and a third row of contacts, the first signal line is coupled to the first row of contacts, the third signal line is coupled to the second row of contacts, and the fourth signal line is coupled to the third row of contacts.

7. The electronic device of claim 6, wherein the memory card slot has an opening, and the first row of contacts, the second row of contacts, and the third row of contacts are arranged in order from the opening to an inner part of the memory card slot.

8. The electronic device of claim 2, wherein the memory card slot comprises eight pins, with four of which being coupled to the memory card access module through the third signal line and other four of which being coupled to the processing unit through the first signal line.

9. The electronic device of claim 2, wherein at least one of a redriver circuit and a retimer circuit is disposed on the first signal line.

10. The electronic device of claim 1, wherein the first signal line, the second signal line, the third signal line, and the fourth signal line are disposed on the circuit board.

* * * * *